(No Model.)
C. HERING.
SECONDARY BATTERY.
No. 429,912. Patented June 10, 1890.
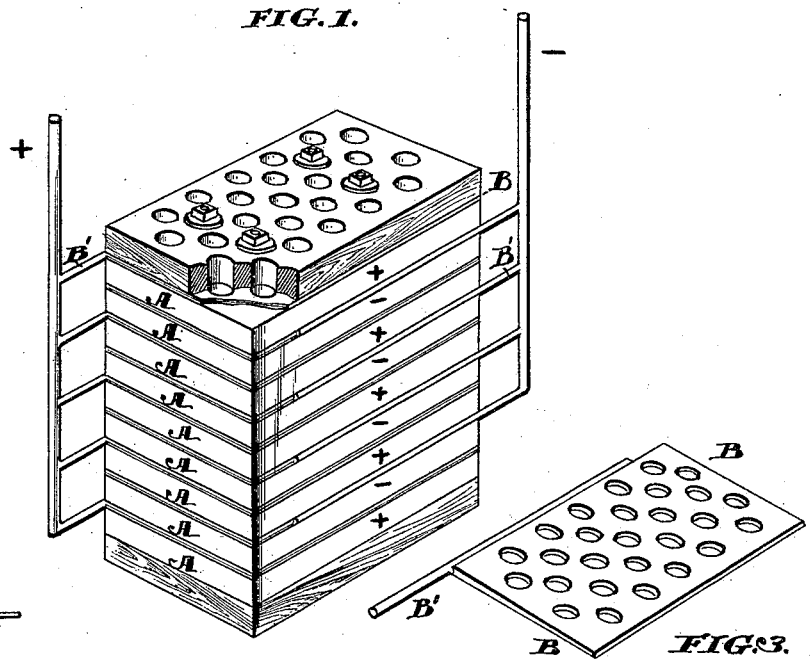
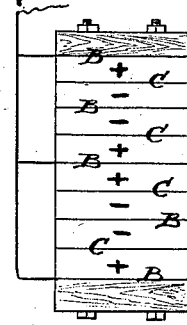
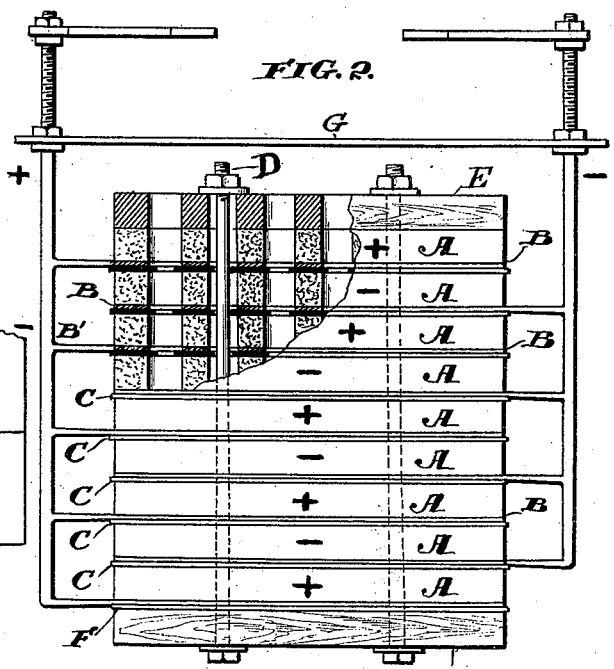
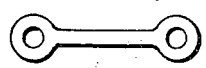
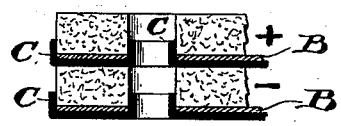
WITNESSES:
David B. Williams
Walter Famariss
INVENTOR:
Carl Hering
per E. Morgan Eldredge
Atty.
THE NORRIS PETERS CO., PHOTO-LITHO., WASHINGTON, D. C.

UNITED STATES PATENT OFFICE.

CARL HERING, OF PHILADELPHIA, PENNSYLVANIA.

SECONDARY BATTERY.

SPECIFICATION forming part of Letters Patent No. 429,912, dated June 10, 1890.

Application filed April 15, 1890. Serial No. 347,942. (No model.)

*To all whom it may concern:*

Be it known that I, CARL HERING, a citizen of the United States of America, residing at Philadelphia, in the county of Philadelphia and State of Pennsylvania, have invented certain new and useful Improvements in Secondary Batteries, (for which I made application for a patent in France on March 11, 1890, No. 191,168,) of which the following is a specification, reference being had therein to the accompanying drawings.

My invention relates to the construction of a secondary-battery cell.

The object of my invention is so to construct and connect the plates of such a battery that they shall not touch each other, that they shall not buckle, that the active material shall not detach itself from its conductor, and that the plates may expand and contract without influencing the conductors, and that the most rapid action possible may be enabled; and my invention consists in a construction and combination of the parts of a secondary-battery cell whereby these results are attained, as hereinafter specified. The chief faults of an ordinary accumulator, consisting of a grid pasted with the active material, are caused by the fact that the active material expands and contracts during charge and discharge while the metallic conductor to which it is applied remains rigid, with the result that in the expansion of the material the plate buckles and changes its shape, and in contracting it loosens its hold upon the conducting-grid and falls out or becomes partially insulated by being separated from its conductor by a layer of sulphate, which forms between the conductor and the active material when the contact is not good. Another fault is that owing to the above or other reasons an ordinary accumulator cannot be charged or discharged rapidly without buckling or short-circuiting or falling out of the active material or otherwise becoming damaged. I avoid these evils by the construction of my battery in the following manner: I make homogeneous plates of active material in the form of slabs. On one or both of the surfaces of each plate I place a sheet of lead or other conducting material, with a rheophore to lead off the current from that plate. These plates with their conductors are respectively separated from adjacent plates of opposite polarity by sheets of non-conducting material, (porous or not)—such as celluloid, parchment paper, porous porcelain, or the like. Preferably such plates and sheets are placed horizontally, and they are so placed that a conducting-sheet is in contact with every plate and a non-conducting sheet is between every two adjacent plates of different polarity. This forms an operative pile; but to insure good contact two plates of material mechanically strong are placed one above and one below the pile, and are drawn or pressed together by bolts or other means, holding the pile solid and forming of it practically an integral block. The charge and discharge of the plates take place chiefly on the edges. To increase this active surface the plates are made with numerous holes of considerable size extending through the slab. The conducting-sheets are made with similar and corresponding holes. The non-conducting sheets are generally made with holes corresponding to the holes in the plates to allow the charge and discharge to take place in and from the edges within the holes of adjacent plates, all which surface thus becomes active working-surface.

Referring to the accompanying drawings, Figure 1 is a perspective view of a block hereinbefore described. Fig. 2 is a vertical elevation of the same, shown partly in section. Figs. 3 and 4 show a plan and side elevation of a conducting-sheet with its rheophore. Fig. 5 is a detail showing flanged holes and turned-up edge of the non-conducting sheets. Fig. 6 shows a different relative disposition of the positive and negative plates. Fig. 7 is a conducting-link for connecting cells.

A A are plates of active material.

B B are conducting-sheets.

B' B' are rheophores.

C C are non-conducting sheets.

D D are bolts for clamping together the plates and sheets by means of the plates E, of material mechanically strong.

F is a sheet of elastic rubber.

G forms the lid to the cell when the block is placed therein.

It will be seen that by this arrangement the plates can expand or contract in their length and breadth without buckling or loosening their contact with their conductors. The positive plates can also expand in the direction of their thickness, because the negative plates are soft and somewhat elastic; but to supplement this elasticity I insert in the pile some material elastic in that direction—such as by using non-conducting sheets of soft elastic rubber or by putting rubber washers on the bolts, or by equivalent means. It is evident that even if the plates should be broken no part of any considerable size can be detached.

In order to prevent small broken particles from falling and making improper connection the non-conducting sheets are made slightly larger than the plates, so as to project beyond them, and are preferably turned up on their edges, and the holes in the sheets are made smaller than the holes in the plates and are preferably cupped or flanged, forming a small trough around the plate and within each hole, so as to catch and retain such small broken particles.

It is evident that there may be many different modifications of the general arrangement herein described. For instance, the plates are shown horizontal; but they may be vertical or inclined. The holes may be of any desired shape or size. The thickness of the plates and the number of contact-plates may be changed to suit the desired rate of discharge. The plates may be alternately positive and negative, or there may be several positives together alternating with several negatives, as seen in Fig. 6. The material for separating the plates may be a dense substance like celluloid, or a porous substance, in which case the surfaces next to this are also rendered active surfaces. It is evident that by this arrangement the metallic conducting-sheets for the positive plates when corroded may be removed and replaced by new ones. It is also evident that in order to avoid the making of plates inconveniently large several smaller blocks may be placed in one jar and connected as one accumulator.

I claim as my invention—

1. An accumulator consisting of positive and negative plates of active material each with a conducting-sheet, the plates of opposite polarity being separated from each other by non-conducting sheets, the series of plates and sheets being secured together by pressure and the plates being separated from each other only by the thickness of the conducting and non-conducting sheets.

2. An accumulator consisting of positive and negative plates of active material each with a conducting-sheet, the plates of opposite polarity being separated from each other by non-conducting sheets, the series of plates and sheets being secured together by pressure and the plates being separated from each other only by the thickness of the conducting and non-conducting sheets, and an elastic medium between the points of compression adapted to yield to the expansion of the plates.

3. An accumulator consisting of positive and negative plates of active material having numerous holes, each plate having a conducting-sheet, the plates of opposite polarity being separated from each other by non-conducting sheets, and holes in said non-conducting sheets corresponding to the holes in the plates adapted to allow charge and discharge to take place to and from the edges of opposite holes.

4. An accumulator consisting of positive and negative plates of active material having numerous holes, each plate having a conducting-sheet, the plates of opposite polarity being separated from each other by non-conducting sheets, and holes in said sheets corresponding to and of smaller size than the holes in the plates.

5. An accumulator consisting of positive and negative plates of active material having numerous holes, each plate having a conducting-sheet, the plates of opposite polarity being separated from each other by non-conducting sheets, and holes in said sheets corresponding to and of smaller size than the holes in the plates, said holes being cupped or flanged, so as to form a trough between the flange and the edges of the holes in the plates.

6. An accumulator consisting of positive and negative plates of active material having numerous holes, each plate having a conducting-sheet, the plates of opposite polarity being separated from each other by non-conducting sheets, such non-conducting sheets being larger than the plates.

7. An accumulator consisting of positive and negative plates of active material having numerous holes, each plate having a conducting-sheet, the plates of opposite polarity being separated from each other by non-conducting sheets, such non-conducting sheets being larger than the plates and being turned up on their edges, so as to form troughs around the plates.

In testimony whereof I have affixed my signature in presence of two witnesses.

CARL HERING.

Witnesses:
 GEORGE HOUSE,
 G. MORGAN ELDRIDGE.